(12) United States Patent
Jeong

(10) Patent No.: US 9,559,527 B2
(45) Date of Patent: Jan. 31, 2017

(54) DISCHARGING CIRCUIT, IMAGE FORMING APPARATUS HAVING THE DISCHARGING CIRCUIT, AND POWER SUPPLY UNIT

(71) Applicant: SAMSUNG Electronics Co., Ltd., Suwon-si, Gyeonggi-do (KR)

(72) Inventor: An Sik Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 14/013,111

(22) Filed: Aug. 29, 2013

(65) Prior Publication Data

US 2014/0062421 A1   Mar. 6, 2014

(30) Foreign Application Priority Data

Aug. 30, 2012   (KR) .................. 10-2012-0095577

(51) Int. Cl.
*H02J 7/00* (2006.01)
*H02J 3/00* (2006.01)
*H02M 1/12* (2006.01)
*H02M 1/32* (2007.01)

(52) U.S. Cl.
CPC .. *H02J 7/00* (2013.01); *H02J 3/00* (2013.01); *H02M 1/126* (2013.01); *H02M 2001/322* (2013.01)

(58) Field of Classification Search
USPC .................................................. 320/130, 166
See application file for complete search history.

(56) References Cited

U.S. PATENT DOCUMENTS

| | | | |
|---|---|---|---|
| 4,706,009 A * | 11/1987 | Schwarz | 320/138 |
| 6,252,786 B1 * | 6/2001 | Ahn | 363/84 |
| 2007/0035278 A1 * | 2/2007 | Mullett et al. | 320/130 |
| 2010/0090618 A1 * | 4/2010 | Veltman | 315/307 |
| 2011/0025278 A1 * | 2/2011 | Balakrishnan et al. | 320/166 |
| 2012/0133285 A1 * | 5/2012 | Kelly | 315/121 |
| 2013/0188405 A1 * | 7/2013 | Jin et al. | 363/49 |
| 2013/0307415 A1 * | 11/2013 | Ni | H05B 33/0812 315/122 |

FOREIGN PATENT DOCUMENTS

JP    2000184718    6/2000

* cited by examiner

*Primary Examiner* — Brian Ngo
(74) *Attorney, Agent, or Firm* — Staas & Halsey LLP

(57) ABSTRACT

A discharge circuit, an image forming apparatus having the discharge circuit, and a power-supply unit are disclosed to minimize a standby power generated in a standby mode and improve a discharging speed of a capacitor charged with electricity by the AC power in a power off mode. The discharge circuit connected between AC power input lines receiving an AC power includes a first resistor and a first switch element connected in series between the AC power lines, and a second resistor and a second switch element which are connected in series between the AC power lines, turn off the first switching element upon receiving an electric current during supply of the AC power, and turn on the first switching element in response to cutoff of the AC power to discharge the first capacitor.

24 Claims, 8 Drawing Sheets

DISCHARGING CIRCUIT, IMAGE FORMING APPARATUS HAVING THE DISCHARGING CIRCUIT, AND POWER SUPPLY UNIT

CROSS-REFERENCE TO RELATED APPLICATIONS

This application claims priority under 35 U.S.C, §119 from Korean Patent Application No. 10-2012-0095577, filed on Aug. 30, 2012 in the Korean Intellectual Property Office, the disclosure of which is incorporated herein by reference in its entirety.

BACKGROUND OF THE INVENTION

1. Field of the Invention

Embodiments of the present general inventive concept relate to a discharging circuit, an electronic apparatus or an image forming apparatus having the discharging circuit, and a power supply unit to reduce a standby power.

2. Description of the Related Art

For energy saving from the viewpoint of the protection of the environment, standby power restriction of electronic appliances has been strongly carried out not only by domestic stages but also by American (EPA 1.2) and European (ErP Stage 2) stages. In order to overcome the above-mentioned standby power restriction problem, various efforts for reducing standby power of electronic appliances have been conducted.

An electromagnetic interference (EMI) filter for eliminating noise may be installed at an input terminal of the power supply apparatus (for example, SMPS). Charges of X-capacitor installed at the EMI filter may flow in a metal terminal of a plug when the plug is turned off, causing a safety problem. Therefore, a discharge resistor for discharging electric charges charged in the X-capacitor may be useable to resolve the above problem. However, since a power loss occurs in a standby mode due to the discharge resistor, this is a retrograde step for efforts to reduce standby power of electronic appliances, such that a countermeasure against the above-mentioned problem is needed.

SUMMARY OF THE INVENTION

The present general inventive concept provides a discharge circuit, an electronic apparatus, for example, an image forming apparatus having the discharge circuit, and a power-supply unit to minimize a standby power generated in a standby mode of the electronic apparatus and to improve a discharging speed of a capacitor thereof when the electronic apparatus is turned off.

Additional features and utilities of the present general inventive concept will be set forth in part in the description which follows and, in part, will be obvious from the description, or may be learned by practice of the general inventive concept.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing a discharge circuit connected between AC power input lines receiving an AC power to discharge a first capacitor charged with electricity by the AC power, the discharging circuit including a first resistor and a first switch element which are connected in series between the AC power input lines, and a second resistor and a second switch element which are connected in series between the AC power input lines, turn off the first switching element upon receiving an electric current during a supply of the AC power, and turn on the first switching element in response to a cutoff of the AC power to discharge the first capacitor through the first resistor and the first switch element, wherein a resistance value of the second resistor is relatively higher than a resistance value of the first resistor.

The first switch element may be turned on by turning off the second switch element, and the first switch element may be turned off by turning on the second switch element.

The discharge circuit may further include a second capacitor charged with electricity through the second resistor during the supply of the AC power to turn on the second switch element, and a third resistor to turn off the second switch element by discharging the second capacitor during the cutoff of the AC power.

An on/off control terminal of the first switch element may be connected between the second resistor and the second switch element.

The discharge circuit may further include a rectifier element connected from the second resistor to the second capacitor in a manner that a current flowing through the second resistor is supplied to the second capacitor.

When a turn-on voltage of the second switch element is set to 0.7V and an input voltage is a DC voltage, a resistance value of the first resistor and capacitance of the second capacitor may be determined in a manner that a time constant decided by the first resistor and the second capacitor is less than 8.45.

The second resistor may be comprised of a single resistor.

The second resistor may be comprised of a plurality of resistor elements connected in series.

The second switch element may be a bipolar transistor.

The second switch element may be a Metal Oxide Semiconductor Field Effect Transistor (MOSFET).

The first resistor may be comprised of a single resistor element.

The first resistor may be comprised of a plurality of resistor elements connected in series.

The foregoing and/or other features and utilities of the present general inventive concept may also be achieved by providing a discharge circuit connected between AC power input lines receiving AC power so as to discharge a first capacitor charged with electricity by the AC power, the discharging circuit including a first discharge circuit which includes a first resistor and a first switch element connected in series between the AC power input lines, and a second resistor and a second switch element which are connected in series between the AC power input lines, turn off the first switching element upon receiving an electric current during a supply of the AC power, and turn on the first switching element in response to a cutoff of the AC power to discharge the first capacitor in a direction of a first polarity through the first resistor and the first switch element, and a second discharge circuit which includes a third resistor and a third switch element connected in series between the AC power input lines, and a fourth resistor and a fourth switch element which are connected in series between the AC power input lines, turn off the third switching element upon receiving an electric current during the supply of the AC power, and turn on the third switching element in response to the cutoff of the AC power to discharge the first capacitor in a direction of a second polarity opposite to the first polarity through the third resistor and the third switch element, wherein a resistance value of the second resistor is relatively higher than a resistance value of the first resistor, and a resistance value of the fourth resistor is relatively higher than a resistance value of the third resistor.

The first discharge circuit may enable the first switch element to be turned on by a turn-off state of the second switch element, and may enable the first switch element to be turned off by a turn-on state of the second switch element.

The first discharge circuit may include a second capacitor charged with electricity through the second resistor during the supply of the AC power to turn on the second switch element; and a fifth resistor to turn off the second switch element by discharging the second capacitor during the cutoff of the AC power.

The second discharge circuit may enable the second switch element to be turned on by a turn-off state of the fourth switch element, and may enable the fourth switch element to be turned off by a turn-on state of the second switch element.

The second discharge circuit may include a second capacitor charged with electricity through the fourth resistor during the supply of the AC power such that the fourth switch element is turned on, and a sixth resistor usable with the second capacitor to turn off the fourth switch element by discharging the fourth capacitor during the cutoff of the AC power.

The first discharge circuit and the second discharge circuit may be complementarily discharged according to polarity variation of the AC power.

The foregoing and/or other features and utilities of the present general inventive concept may also be achieved by providing an image forming apparatus which includes a discharge circuit connected between AC power input lines receiving AC power to discharge a first capacitor charged with electricity by the AC power. The discharge circuit may include a first resistor and a first switch element which are connected in series between the AC power input lines, and a second resistor and a second switch element which are connected in series between the AC power input lines, turn off the first switching element upon receiving an electric current during a supply of the AC power, and turn on the first switching element in response to a cutoff of the AC power to discharge the first capacitor through the first resistor and the first switch element, wherein a resistance value of the second resistor is relatively higher than a resistance value of the first resistor.

The foregoing and/or other features and utilities of the present general inventive concept may also be achieved by providing an image forming apparatus which includes a discharge circuit connected between AC power input lines receiving AC power to discharge a first capacitor charged with electricity by the AC power. The discharge circuit may include a first discharge circuit which includes a first resistor and a first switch element connected in series between the AC power input lines, and a second resistor and a second switch element which are connected in series between the AC power input lines, turn off the first switching element upon receiving an electric current during a supply of the AC power, and turn on the first switching element in response to a cutoff of the AC power to discharge the first capacitor in a direction of a first polarity through the first resistor and the first switch element, and a second discharge circuit which includes a third resistor and a third switch element connected in series between the AC power input lines and a fourth resistor and a fourth switch element which are connected in series between the AC power input lines, turn off the third switching element upon receiving an electric current during the supply of the AC power, and turn on the third switching element in response to the cutoff of the AC power to discharge the first capacitor in a direction of a second polarity opposite to the first polarity through the third resistor and the third switch element, wherein a resistance value of the second resistor is relatively higher than a resistance value of the first resistor, and a resistance value of the fourth resistor is relatively higher than a resistance value of the third resistor.

The foregoing and/or other features and utilities of the present general inventive concept may also be achieved by providing a power supply unit including a discharge circuit connected between AC power input lines receiving AC power to discharge a first capacitor charged with electricity by the AC power. The power supply unit may include a resistor and a switch element connected in series between the AC power input lines, and a controller to turn off the switch element in response to a DC voltage drop detection signal.

The power supply unit may further include a battery to supply power to the controller when the AC power is cut off.

The resistor may include a plurality of resistor elements connected in series

The resistor and the switch element may be connected between the first capacitor and a power source to supply the AC power through the Ac power input lines.

The first capacitor is a capacitor of an EMI filter.

The foregoing and/or other features and utilities of the present general inventive concept may also be achieved by providing an image forming apparatus including an EMI filter having a capacitor, and a discharge unit connected between the EMI filter and an AC power source through AC power lines and having a first switching element to be turned on to discharge the capacitor of the EMI according to a level of a voltage of the image forming apparatus in a power off mode.

The image forming apparatus may further include a second switching element disposed to turn on and the first switching element according to the voltage level.

The first switching element may include a first resistor and a transistor, the second switching element may include a second resistor and a second capacitor, and the second resistor may have a resistance higher than a resistance of the first resistor.

The image forming apparatus may further include a controller to control the switching transistor to turn on or off according to the voltage level.

The image forming apparatus may further include a battery to supply a power to the controller.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
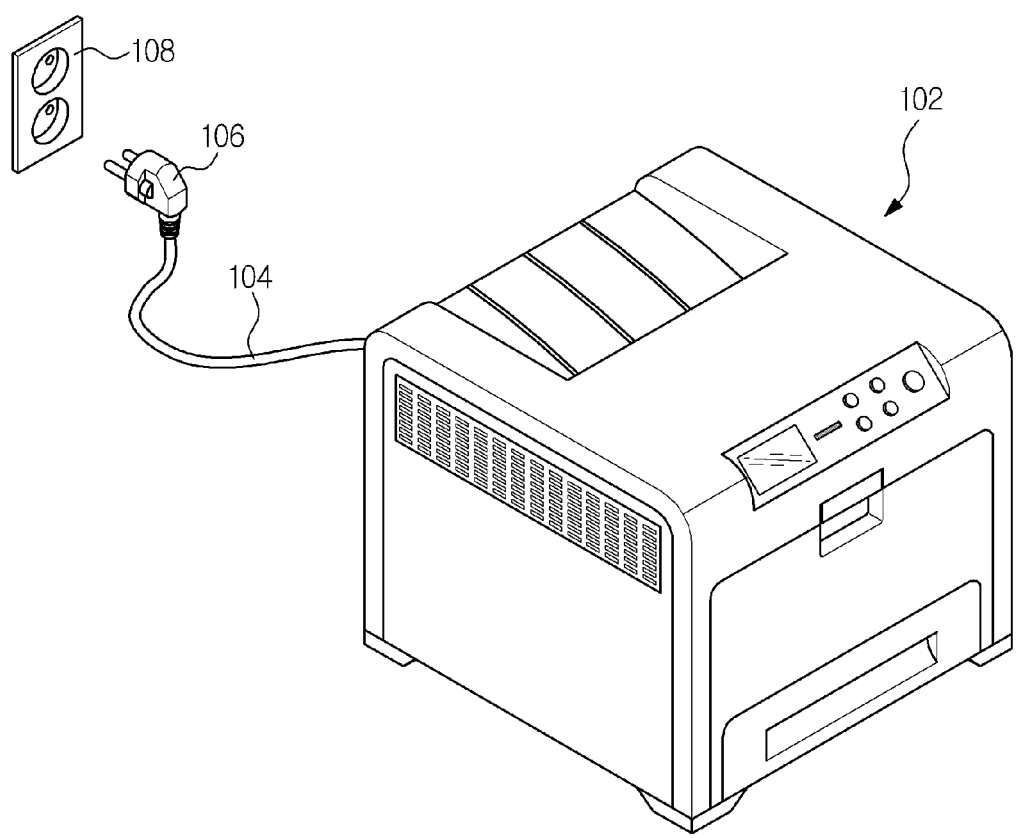
FIG. 1 illustrates an image forming apparatus as an electronic apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates an image forming apparatus 102 as an electronic apparatus according to an embodiment of the present general inventive concept. FIG. 1 illustrates a laser printer as the image forming apparatus 102. However, the present general inventive concept is not limited thereto. It is possible that other types of printers can be used as the image forming apparatus 102. It is also possible that a portable and desktop electronic apparatus or home and office appliance can be used as the electronic apparatus.

Referring to FIG. 1, the image forming apparatus 102 includes a power cable 104 to receive a power from an external apparatus and a plug 106 provided at one end of the power cable 104. The plug 108 is inserted into an outlet or a socket 108 of a multi-tap, such that a commercial AC power from an external power supply source may be supplied to the image forming apparatus 102. The image forming apparatus 102 receives a power through the plug 106 inserted into the socket 108 and the power cable 104 connected between the plug 106 and the external power supply, such that the image forming apparatus 102 performs tasks associated with image processing and/or image forming. In the following description, an operation of inserting the plug 106 into the socket 108 or turning on the image forming apparatus 102 will hereinafter be referred to as Plug-On, and an operation of separating the plug 106 from the socket 108 or turning off the image forming apparatus 102 will hereinafter be referred to as Plug-Off. Although FIG. 1 illustrates a wired charging system, it is possible that the present general inventive concept can be applied to a wireless charging system, a near field charging system, etc., usable with the electronic apparatus.

Figure 2:
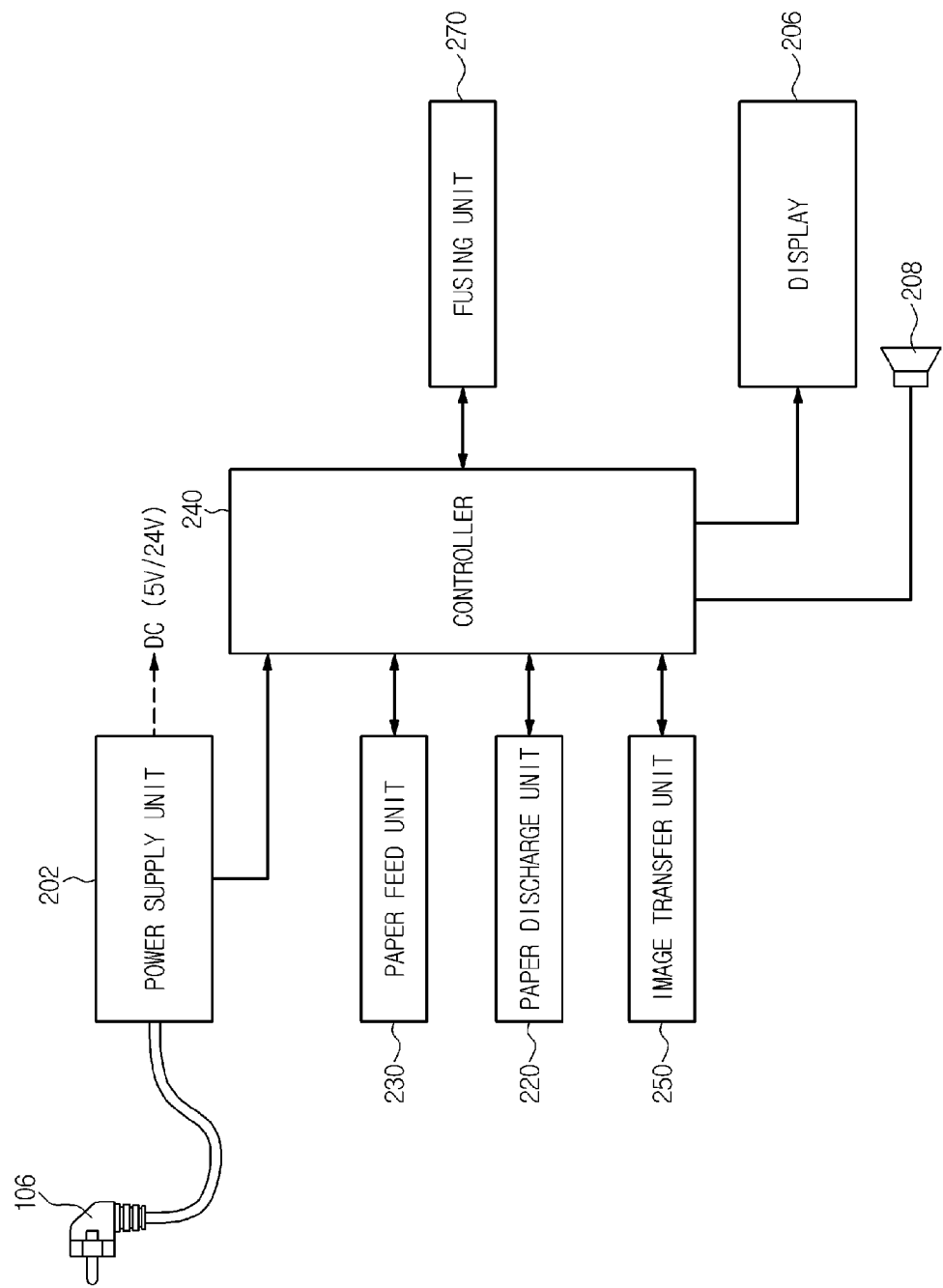
FIG. 2 is a block diagram illustrating a control system of the image forming apparatus of FIG. 1.

FIG. 2 is a block diagram illustrating a control system of the image forming apparatus 102 of FIG. 1 according to an embodiment of the present general inventive concept. Referring to FIG. 2, a control unit 240 configured to control overall operations of the image forming apparatus 102 is electrically connected to a paper feed unit 230, a paper discharge unit 220, an image transfer unit 250, a fusing unit 270, a display 206, and a speaker 208. A power supply unit 202 (for example, Switching Mode Power Supply, SMPS) generates a system DC power of a plurality of different voltages, for example, 5V and 24V, such that the 5V and 24V system DC powers are applied to the controller 240, the image transfer unit 270, and other several units and components, respectively. In addition, the power supply unit 202 may also provide input commercial AC power to one or more corresponding units or components (for example, a fixing heater of the fusing unit 270). The paper feed unit 230 feeds a printing medium (a sheet of paper) loaded in a paper feeding cassette to the image transfer unit 250. The image transfer unit 250 forms a predetermined image according to an image signal, and transfers the formed image to the printing medium. The fusing unit 270 fixes the transferred image to the printing medium. The paper discharge unit 220 discharges the printing medium, onto which the image has been fixed by the fusing unit 270, to an outside thereof. The controller 240 controls overall operations of the image forming apparatus 102, and is electrically connected to a plurality of sensors to detect states of respective units or components of the image forming apparatus 102. The display 206 displays information messages and the like, which inform a user of operation- or state-information of the image forming apparatus 102. The speaker 208 outputs information sound or alarm sound generated when the image forming apparatus 102 is operated.

Figure 3:
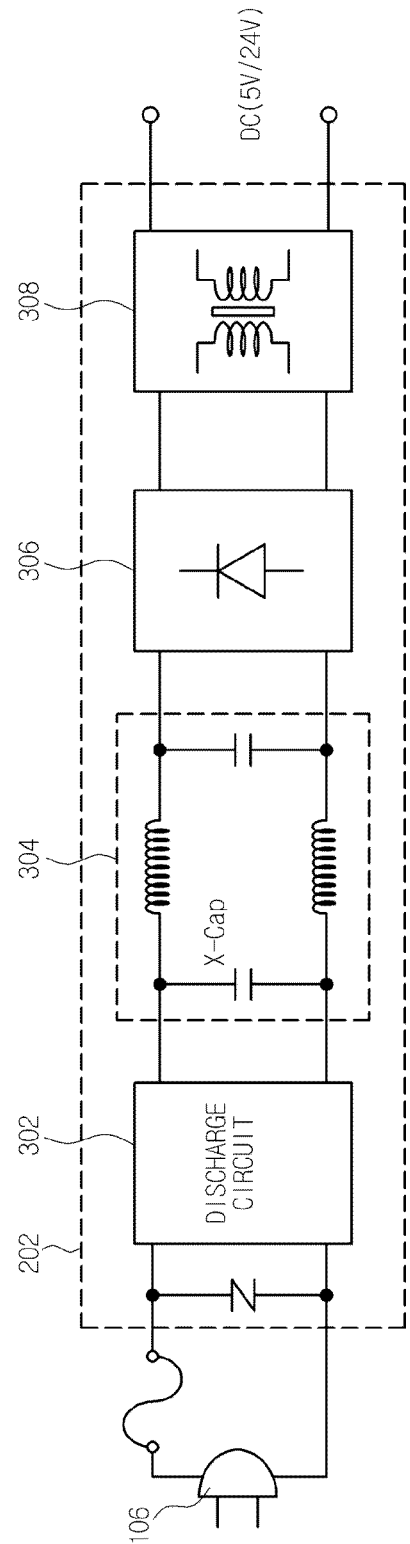
FIG. 3 illustrates a power supply unit of FIG. 2 according to an embodiment of the present general inventive concept.

FIG. 3 is a view illustrating the power supply unit 202 of FIG. 2 according to an embodiment of the present general inventive concept. Referring to FIG. 3, the power supply unit 202 includes a discharge circuit 302, an EMI filter 304, a rectifier 306, and a transformer 308. The discharge circuit 302 discharges a first capacitor, such as the X-capacitor (X-Cap) of the EMI filter 304. The EMI filter 304 may remove various noises contained in the power cable 104 receiving a commercial power (AC or DC power). A line filter having a coil and a capacitor may be useable as the EMI filter 304. The rectifier 306 may convert an AC power into a DC power, or may convert one AC power into another AC power having an objective different phase. The transformer 308 reduces a DC voltage rectified by the rectifier 306 such that an objective DC voltage having a desired level is generated.

Referring to FIG. 3, the power supply unit 202a generates two system DC powers, for example, 5V and 24V, through an AC-DC conversion. The DC power of 5V is applied to a microprocessor, such as the controller 240 and a circuit element, and the DC power of 24V is applied to the fusing unit 170 or the like. It is possible that the system DC power of 5V or 24V generated from the power supply unit 202a may be selectively applied to other constituent units or elements (components) of the image forming apparatus 102.

The X-Cap of the EMI filter 304 illustrated in FIG. 3 is charged with a commercial power applied to the power supply unit 202 in a case of a plug-on state, and is then discharged by the discharge circuit 302 in a case of a plug-off state. If the X-Cap is not discharged after being charged, a charging voltage appears at both ends of a metal terminal of the plug 106 such that there is a need to discharge the X-Cap for safety.

Figure 4:
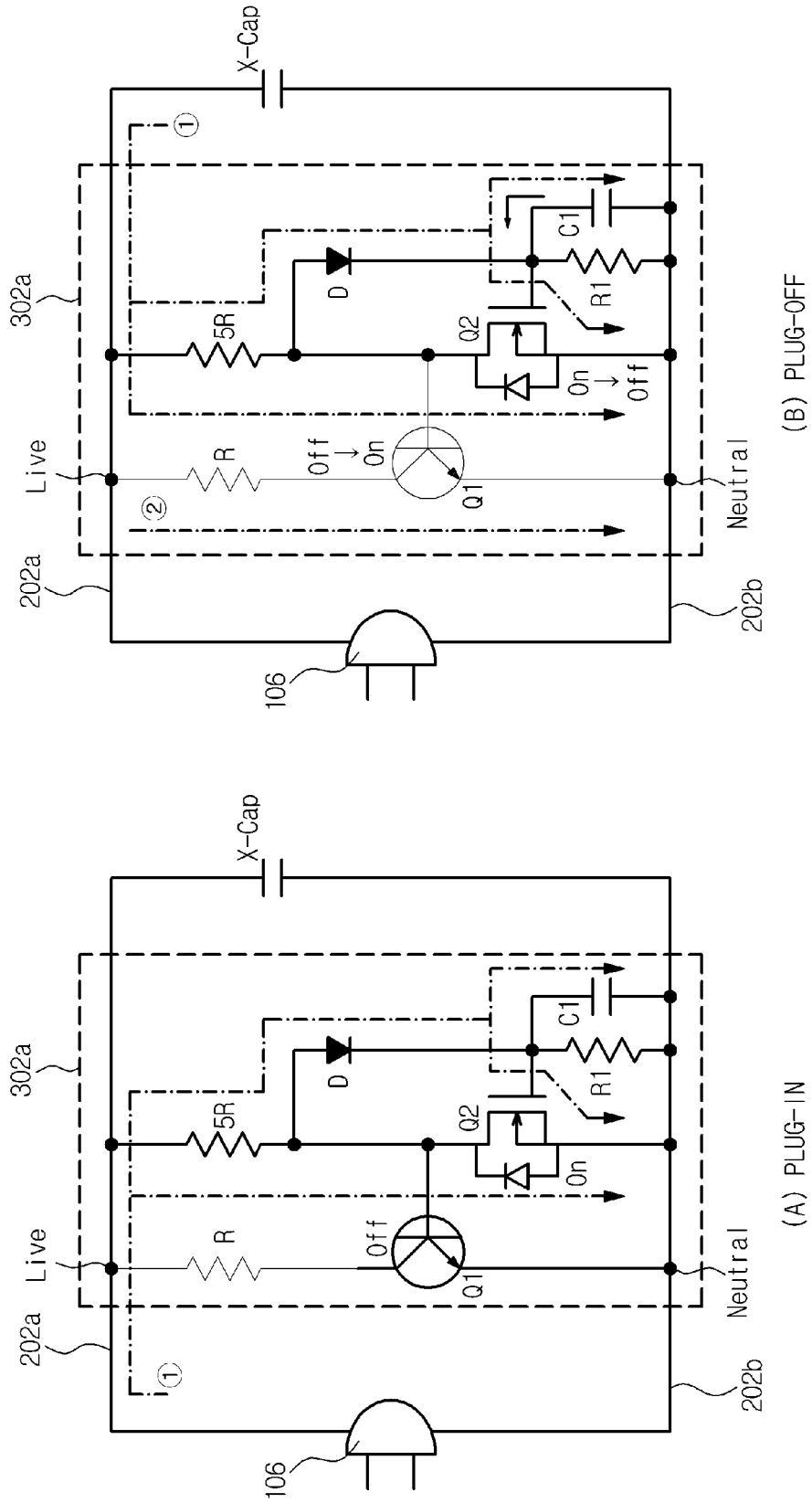
FIG. 4 illustrates a discharge circuit of FIG. 3 according to an embodiment of the present general inventive concept.

FIG. 4 illustrates a discharge circuit 302a corresponding to the discharge circuit 302 of FIG. 3 according to an embodiment of the present general inventive concept. A view (A) of FIG. 4 illustrates a plug-on state, and a view (B) of FIG. 4 illustrates a plug-off state. Referring to the view (A) of FIG. 4, a discharge resistor R and a first switch or transistor, for example, a bipolar transistor Q1, are connected in series between both terminals (first and second terminals or Live and Neutral terminals) of AC power input lines 202a and 202b, and a resistor 5R and a second switch or transistor, for example, a Metal Oxide Semiconductor Field Effect Transistor (MOSFET) Q2, connected in series are connected in parallel to the discharge resistor R and the bipolar transistor Q1. A base terminal of the bipolar transistor Q1 is connected between the resistor 5R and the MOSFET Q2, and a resistor R1 and a second capacitor, for example, a capacitor C1, are connected in parallel between a gate terminal and a neutral terminal of the MOSFET Q2. A diode D is connected between a node disposed between the resistor 5R and the MOSFET Q2 and a gate terminal of the MOSFET Q2.

The discharge circuit 302a may minimize a power consumption caused by a discharge resistance generated in a plug-on mode, and is operated as follows.

First, the capacitor C1 is charged by input power in a plug-on state, and a voltage of a gate terminal of the MOSFET Q2 is increased, such that the MOSFET Q2 is turned on. The turned-on MOSFET Q2 allows a current flowing through the resistor 5R to flow in a neutral terminal, such that the bipolar transistor Q1 is turned off. The bipolar transistor Q1 is turned off, such that a portion disposed between the discharge resistor R and the neutral terminal is switched off and the X-Cap is not discharged through the discharge resistor R. In this case, a power loss may occur by the turned-on MOSFET Q2. In this case, the power loss may be a small power loss compared to the other power loss. It is possible that an amount of the generated power loss is relatively very smaller than the other power loss generable when the bipolar transistor Q1 is turned on. For example, the power loss generated in the discharge resistor R is denoted by a formula of $P=V^2/R_{discharge}$, where the V is voltage drop across the discharge resistor R, and a condition having no problem in a corresponding standard is denoted by a formula of $R*C<1$, such that a resistor of 680 kΩ is generally used as the discharge resistor R. The power loss generated by the plug-on state when the input AC power is set to 230V is considered to be a constant power loss of 2302/680 k=0.08 W. In the case of most MOSFETs, an amount of a power consumption generated under the turn-on state does not greatly reach 0.08 W. As the power loss generated by the turned-on MOSFET Q2 of the view (A) of FIG. 4 causes to turn off the bipolar transistor Q1, discharging through the discharge resistor R is not achieved, such that the amount of the power loss may be relatively very low as compared to an obtainable power loss restriction effect.

A voltage charged in the X-Cap within a very short period of time (for example, one second) needs to drop to a level such that the level of the voltage is not harmful to humans in the plug-off mode. For this purpose, the bipolar transistor Q1 is turned back on such that the X-Cap can be rapidly discharged. In the plug-off mode, charges charged in the capacitor C1 are rapidly discharged through the resistor R1, such that the MOSFET Q2 is turned off. If the MOSFET Q2 is turned off, a current flows in a base terminal of the bipolar transistor Q1 so that the bipolar transistor Q1 is turned on. As a result, charges of the X-Cap are rapidly discharged through the discharge resistor R and the turned-on bipolar transistor Q1. Through a size adjustment of the discharge resistor R, a desired discharge speed of the X-Cap can be achieved through the discharge resistor R. If the X-Cap standard is changed to satisfy EMI characteristics of the EMI filter 304, the standard of the discharge resistor R can be flexibly changed.

Figure 5:
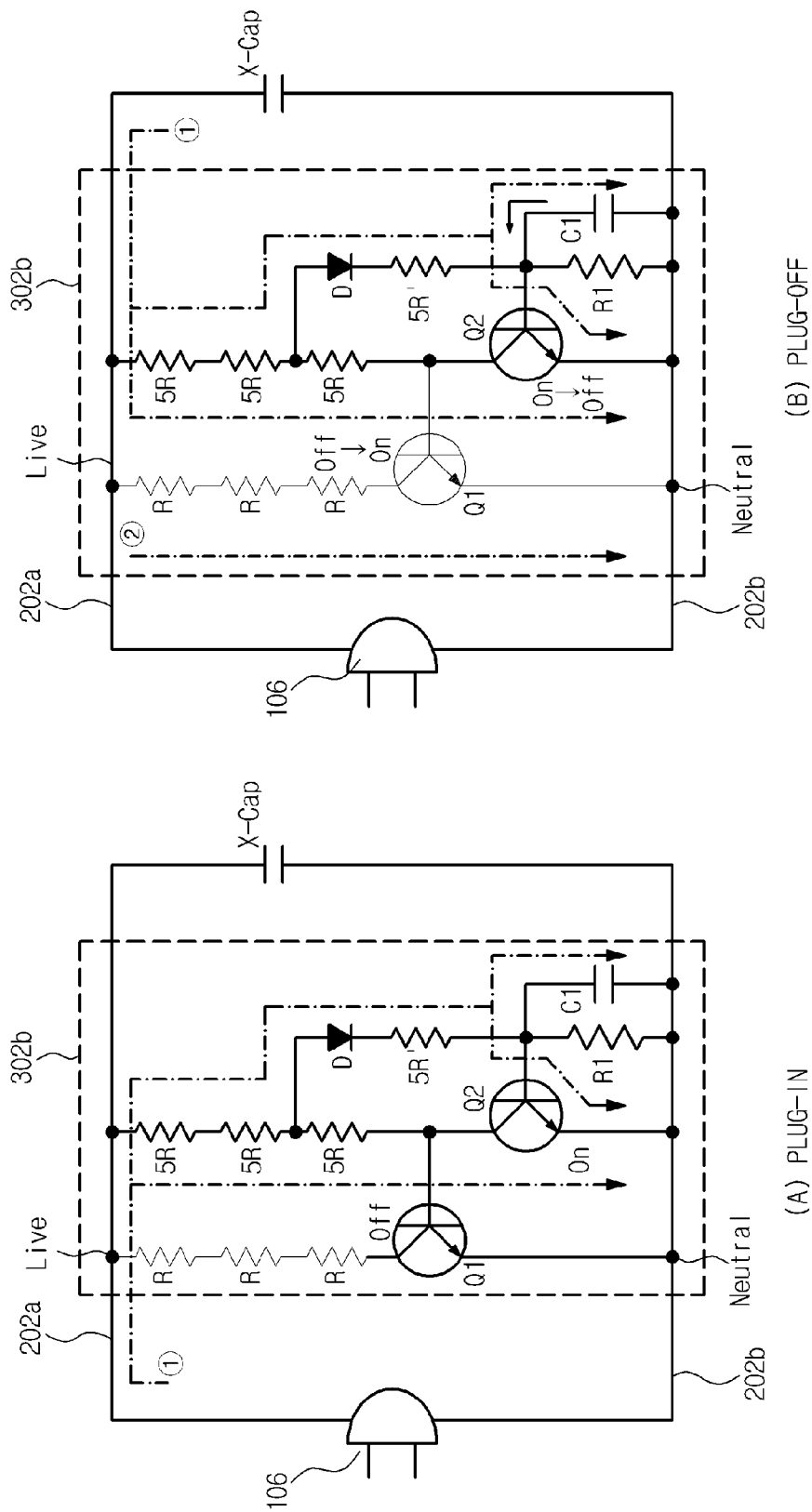
FIG. 5 illustrates a discharge circuit of FIG. 3 according to an embodiment of the present general inventive concept.

FIG. 5 illustrates a discharge circuit 302b corresponding to the discharge circuit 302 of FIG. 3 according to an embodiment of the present general inventive concept. A view (A) of FIG. 5 illustrates a plug-on state, and a view (B) of FIG. 5 illustrates a plug-off state. Referring to the view A) of FIG. 5, one or more discharge resistors R and a bipolar transistor Q1 are connected in series between both terminals (Live, Neutral) of the AC power input line, and one or more resistors 5R and a bipolar transistor Q2 connected in series to each other are connected in parallel to the discharge resistors R and the bipolar transistor Q1. A base terminal of the bipolar transistor Q1 is connected between the resistor 5R and the bipolar transistor Q2, and a resistor R1 and a capacitor C1 (second capacitor) are connected in parallel between a base terminal and a neutral terminal of the bipolar transistor Q2. A diode D and a resistor 5R' are connected between a node disposed between the resistor 5R and the bipolar transistor Q2 and a base terminal of the bipolar transistor Q2.

The discharge circuit 302a may minimize a power consumption caused by a discharge resistance generated in a plug-on mode, and is operated like the discharge circuit 302a of FIG. 4 so that a standby power loss is minimized.

However, the discharge circuit 302b connects the one or more discharge resistors R in series as illustrated in FIG. 5, such that a discharge resistance R with respect to disturbance such as external surge voltage can be increased. In addition, a universal general resistor instead of a special-purpose resistor can be usable to reduce production costs of the power supply unit 202.

In addition, the resistor 5R is larger in size than the discharge resistor R such that a power loss of the resistor 5R can be reduced during a normal operation, and a turn-on power loss is reduced. In order to implement the turn-on operation of the bipolar transistor Q2 configured to turn on the bipolar transistor Q1, signals are half-wave-rectified using the diode D, and the resistor 5R' is inserted to minimize the half-wave-rectified current, resulting in a current restriction.

In a case of the plug-off mode, charges of the X-Cap must be discharged within a very short time (for example, one second), and a value of the resistor R1 and a value of the capacitor C1 are determined in consideration of the discharge result. That is, assuming that a turn-on voltage of the bipolar transistor Q2 is set to 0.7V and an input voltage is set to a rectified DC voltage, a voltage Vt is denoted by a formula of $Vt=Vt*0.9*(1-e^{(-1/R1C1)})$, a time constant R1C1 is denoted by $R1C1<8.45$, a size of the resistor R1 and a size of the capacitor C1 need to be established to minimize a standby power, such that charges can be discharged within a shortest period of time.

In addition, a discharge time of the X-Cap is associated with charges of a not-rectified AC power, such that R value making a time constant "RC<1" (where C=X-Cap) can be selected and used.

Figure 6:
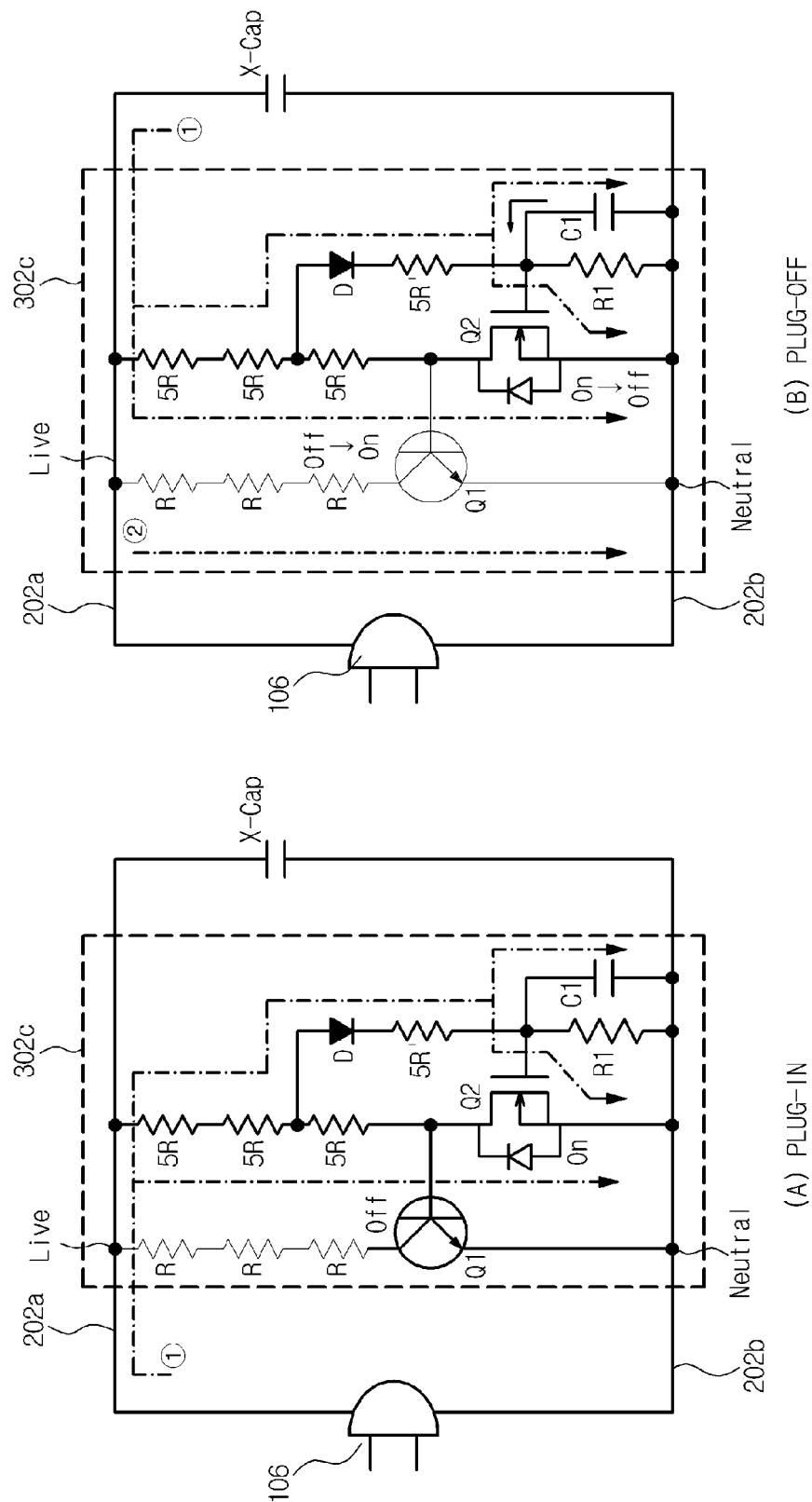
FIG. 6 illustrates a discharge circuit of FIG. 3 according to an embodiment of the present general inventive concept.

FIG. 6 illustrates a discharge circuit 302c corresponding to the discharge circuit 302 of FIG. 3 according to an embodiment of the present general inventive concept. A view (A) of FIG. 6 illustrates a plug-on state, and a view (B) of FIG. 6 illustrates a plug-off state. Referring to FIG. 6, the discharge circuit 302c has a structure to replace the bipolar transistor Q2 of the discharge circuit 302b of FIG. 5 with the MOSFET Q2, one or more discharge resistors R and a bipolar transistor Q1 are connected in series between both terminals (Live, Neutral) of the AC power line, and one or more resistors 5R and the MOSFET Q2 connected in series to each other are connected in parallel to the discharge resistors R and the bipolar transistor Q1. A base terminal of the bipolar transistor Q1 is connected between the resistor 5R and the bipolar transistor Q2, and a resistor R1 and a capacitor C1 (second capacitor) are connected in parallel between a gate terminal and a neutral terminal of the MOSFET Q2. A diode D and a resistor 5R' are connected between a node disposed between the resistor 5R and the MOSFET Q2 and a base terminal of the bipolar transistor Q2.

The discharge circuit 302a may minimize a power consumption caused by a discharge resistance generated in a plug-on mode, and is operated like the discharge circuit 302a of FIG. 4 so that a standby power loss is minimized.

Figure 7:
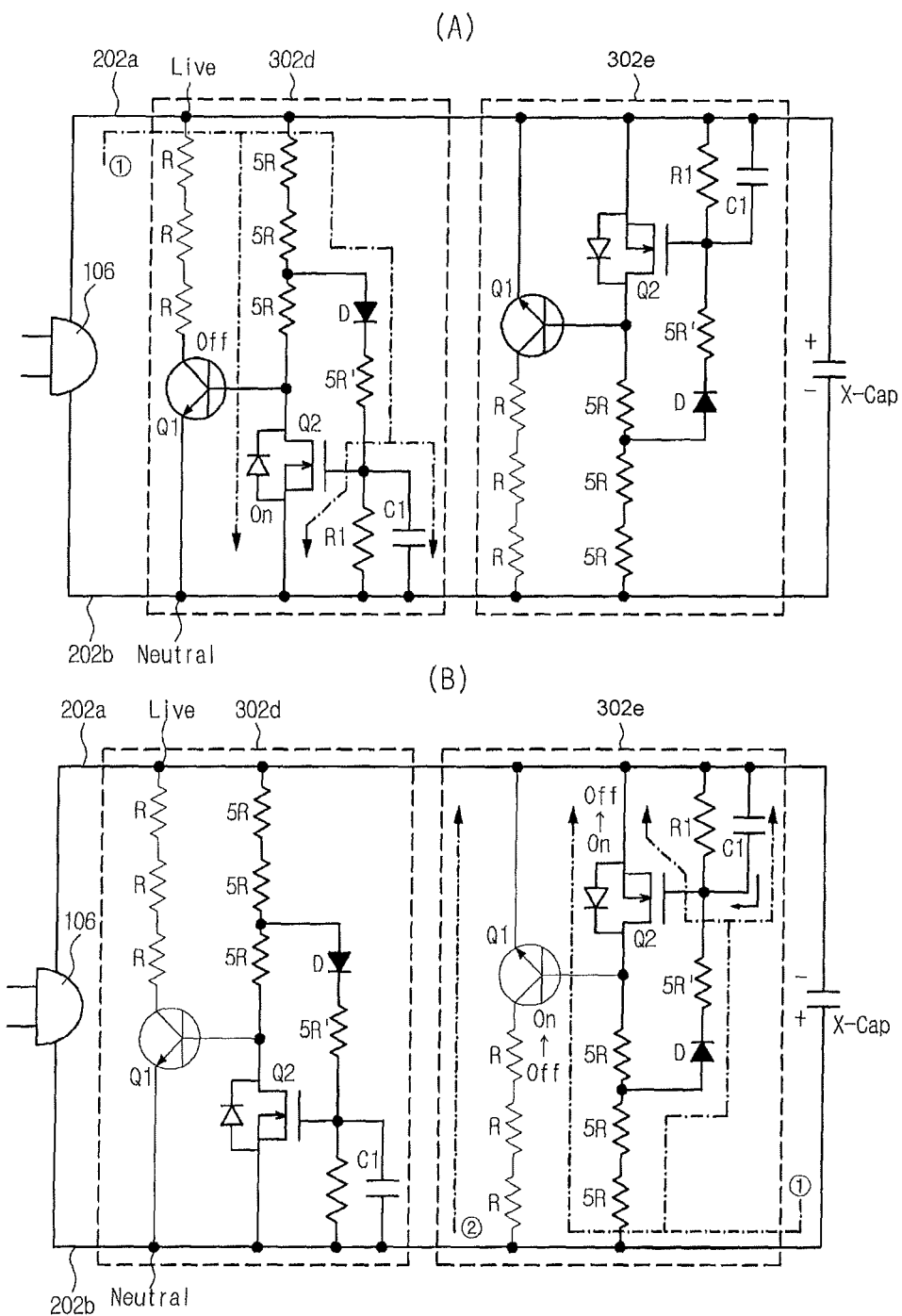
FIG. 7 illustrates a discharge circuit of FIG. 3 according to an embodiment of the present general inventive concept.

FIG. 7 illustrates a discharge circuit 302d corresponding to the discharge circuit 302 of FIG. 3 according to an embodiment of the present general inventive concept. One or more different discharge circuits may be usable as the discharge circuit 302 of FIG. 3 as illustrated in FIG. 7. Referring to a top view (A) of FIG. 7, the discharge circuit unit includes a first discharge circuit 302d and a second discharge circuit 302e, and the first discharge circuit 302d and the second discharge circuit 302e are connected in parallel between both ends (Live, Neutral) of power lines 202a and 202b. The first discharge circuit 302d of FIG. 7 may have a structure same as or similar to that of the discharge circuit 302c of FIG. 6. That is, one or more discharge resistors R (third discharge resistors) and a bipolar transistor Q1 (third switch element) are connected in series between both ends (Live, Neutral) of the power lines 202a and 202b, and one or more resistors 5R and the MOSFET Q2 are connected in parallel to the discharge resistors R and the bipolar transistor Q1. A base terminal of the bipolar transistor Q1 is connected between the resistor 5R and the bipolar transistor Q2, and the resistor R1 and the capacitor C1 are connected in parallel between the gate terminal and the neutral terminal of the MOSFET Q2. A diode D and the resistor 5R' are connected between a node disposed between the resistor 5R and the MOSFET Q2 and the base terminal of the bipolar transistor Q2.

Although the second discharge circuit 302e has a structure same as or similar to that of the first discharge circuit 302d, the first discharge circuit 302d is vertically inverted and connected between both ends (Live, Neutral) of the power lines 202a and 202b. That is, the first discharge circuit 302d is connected in a manner that it is discharged from the live terminal to the neutral terminal, but the second discharge circuit 302e is connected in a manner that it is discharged from the neutral terminal to the live terminal. One or more discharge resistors R (fourth discharge resistors) and the bipolar transistor Q1 (fourth switch element) are provided at the second discharge circuit 302e. The first discharge circuit 302d is discharged to a direction of a first polarity with respect to both ends of a power cable, and the second discharge circuit 302e is discharged to the opposite direction of the first polarity with respect to both ends of the power cable, such that the first and second discharge circuits 302d and 302e can properly cope with bidirectional polarity along which the X-cap is discharged.

The first and second discharge units circuits 302d and 302e according to an embodiment of the present general inventive concept are operated as follows. As illustrated in a view (A) of FIG. 7, under the condition that the X-Cap is charged in a manner that an upper end terminal of the X-Cap has a positive (+) polarity and a lower end terminal thereof has a negative (−) polarity, the X-Cap is discharged by operating the first discharge circuit 302d. However, as illustrated in a bottom view (B) of FIG. 7, under the condition that the X-Cap is charged in a manner that the lower end terminal of the X-Cap has a positive (+) polarity and the upper end terminal thereof has a negative (−) polarity, the X-Cap is discharged by operating the second discharge circuit 304e. By the parallel connection structure between the first discharge circuit 302d and the second discharge circuit 302e, the X-Cap can be safely discharged even though the X-Cap discharge polarity is changed.

Figure 8:
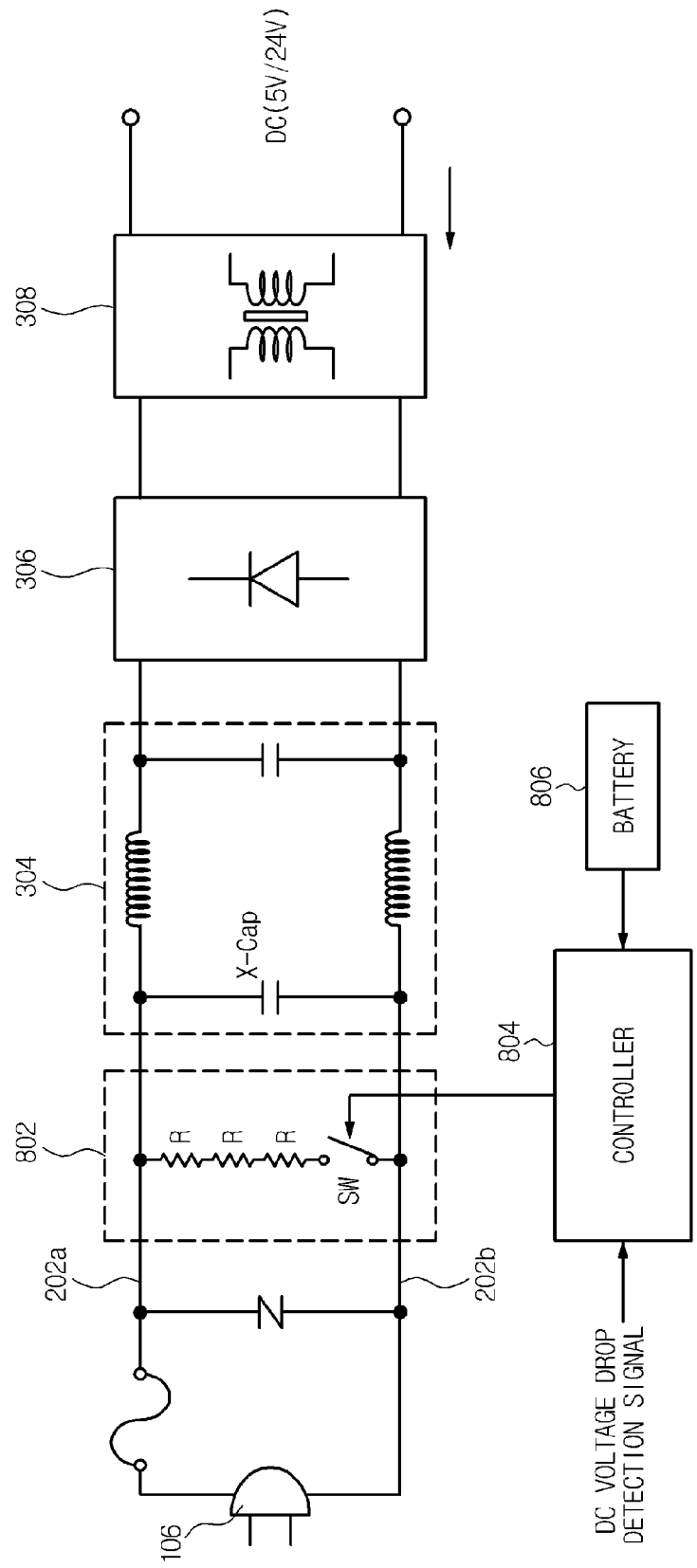
FIG. 8 illustrates a power supply unit of FIG. 2 according to an embodiment of the present general inventive concept.

FIG. 8 is a block diagram illustrating a control system having a power supply unit 202 and a controller 804 of the image forming apparatus 102 of FIG. 2 according to an embodiment of the present general inventive concept. Referring to FIG. 8, the power supply unit 202 includes a discharge circuit unit 802, an EMI filter 304, a rectifier 306, and a transformer 308. The discharge circuit unit 802 may discharge the X-capacitor (X-Cap) of the EMI filter 304. The discharge circuit unit 803 is achieved by serially connecting the resistors R and the switch SW between both ends (Live, Neutral) of power lines 202a and 202b. The EMI filter 304 is used to remove various noise contained in the power cable 104 (See FIG. 1) receiving a commercial power (AC or DC power). A line filter having a coil and a capacitor may be usable as the EMI filter 304. The rectifier 306 may convert an AC power into a DC power, or may convert an AC power into another AC power having a different phase. The transformer 308 reduces a DC voltage rectified by the rectifier 306 to generate an objective DC voltage having a desired level. Since the controller 804 is operated by the battery 806, it can also be operated even during the plug-off mode. The controller 804 generates a discharge control signal according to a DC voltage drop detection signal detected by a detector (not illustrated), such that the controller 804 turns on or off a switch SW of the discharge circuit unit 802. The DC voltage drop detection signal is generated when the DC voltage generated from a secondary portion of the transformer 308 is dropped to a predetermined level or less. The controller 804 recognizes a plug-off time point using the DC voltage drop detection signal, and discharges the X-Cap by turning on the switch SW of the discharge circuit 802. If a predetermined time (for example, one second) required to discharge the X-Cap elapses, the controller 804 turns off the switch SW of the discharge circuit unit 802.

As described above, the power control apparatus and the image forming apparatus according to the embodiment of the present general inventive concept can be applied to all kinds of electronic apparatuses operated by receiving a power not only through a plug inserted into a socket but also through a power cable connected to the plug. For example, the power control apparatus and the image forming apparatus can be applied to all the industrial devices each of which uses power as energy source, office automation devices, household appliances, mobile devices to selectively receive a power through a wired and wired method, etc.

As is apparent from the above description, the embodiment of the present general inventive concept can minimize a standby power generated in a standby mode of an electronic apparatus, and can improve a discharging speed of a capacitor when the electronic apparatus is powered off.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A discharge circuit connected between AC power input lines receiving an AC power to discharge a first capacitor charged with electricity by the AC power, comprising:
   a first resistor and a first switch element which are connected in series between the AC power input lines;
   a second resistor and a second switch element which are connected in series between the AC power input lines and which are connected in parallel to the first resistor and the first switch element, to turn off the first switch element upon receiving an electric current during supply of the AC power, and to turn on the first switch element in response to cutoff of the AC power so as to discharge the first capacitor through the first resistor and the first switch element;
a second capacitor charged with electricity through the second resistor during a supply of the AC power to turn on the second switch element; and
a third resistor usable together with the second capacitor to turn off the second switch element by discharging the second capacitor during the cutting off of the AC power,
wherein at least one of the first switch element and the second switch element is directly connected to a neutral terminal of the AC power input lines.

2. The discharge circuit of claim 1, wherein:
the first switch element is turned on by turning off the second switch element; and
the first switch element is turned off by turning on the second switch element.

3. The discharge circuit of claim 1, wherein an on/off control terminal of the first switch element is connected between the second resistor and the second switch element.

4. The discharge circuit of claim 1, further comprising:
a rectifier element connected from the second resistor to the second capacitor in a manner that a current flowing through the second resistor is supplied to the second capacitor.

5. The discharge circuit of claim 3, wherein:
when a turn-on voltage of the second switch is set to 0.7V and an input voltage is a DC voltage, a resistance value of the first resistor and a capacitance of the second capacitor are determined in a manner that a time constant decided by the first resistor and the second capacitor is less than 8.45.

6. The discharge circuit of claim 3, wherein the second resistor is a single resistor.

7. The discharge circuit of claim 3, wherein the second resistor includes a plurality of resistor elements connected in series.

8. The discharge circuit of claim 3, wherein the second switch element is a bipolar transistor.

9. The discharge circuit of claim 3, wherein the second switch element is a Metal Oxide Semiconductor Field Effect Transistor (MOSFET).

10. The discharge circuit of claim 1, wherein the first resistor is a single resistor element.

11. The discharge circuit of claim 1, wherein the first resistor includes a plurality of resistor elements connected in series.

12. A discharge circuit connected between AC power input lines receiving an AC power to discharge a first capacitor charged with electricity by the AC power, comprising:
a first discharge circuit including:
a first resistor and a first switch element connected in series between the AC power input lines, and
a second resistor and a second switch element which are connected in series between the AC power input lines, turn off the first switch element upon receiving an electric current during supply of the AC power, and turn on the first switch element in response to cutoff of the AC power so as to discharge the first capacitor in a direction of a first polarity through the first resistor and the first switch element; and
a second discharge circuit including:

a third resistor and a third switch element connected in series between the AC power input lines, and
a fourth resistor and a fourth switch element which are connected in series between the AC power input lines, turn off the third switch element upon receiving an electric current during a supply of the AC power, and turn on the third switch element in response to a cutoff of the AC power to discharge the first capacitor in a direction of a second polarity opposite to the first polarity through the third resistor and the third switch element,
wherein a resistance value of the second resistor is higher than a resistance value of the first resistor, and a resistance value of the fourth resistor is relatively higher than a resistance value of the third resistor.

13. The discharge circuit of claim 12, wherein the first discharge circuit enables the first switch element to be turned on by a turn-off state of the second switch element, and enables the first switch element to be turned off by a turn-on state of the second switch element.

14. The discharge circuit of claim 13, wherein the first discharge circuit includes:
a second capacitor charged with electricity through the second resistor during the supply of the AC power so as to turn on the second switch element; and
a fifth resistor usable with the second capacitor to turn off the second switch element by discharging the second capacitor during the cutoff of the AC power.

15. The discharge circuit of claim 12, wherein the second discharge circuit enables the second switch element to be turned on by a turn-off state of the fourth switch element, and enables the fourth switch to be turned off by a turn-on state of the second switch element.

16. The discharge circuit of claim 15, wherein the second discharge circuit includes:
a second capacitor charged with electricity through the fourth resistor during the supply of the AC power to turn on the fourth switch element; and
a sixth resistor usable with the second capacitor to turn off the fourth switch element by discharging the fourth capacitor during the cutoff of the AC power.

17. The discharge circuit of claim 12, wherein the first discharge circuit and the second discharge circuit are complementarily discharged according to polarity variation of the AC power.

18. An image forming apparatus including a discharge circuit connected between AC power input lines receiving an AC power to discharge a first capacitor charged with electricity by the AC power, the discharge circuit comprising:
a first resistor and a first switch element which are connected in series between the AC power input lines;
a second resistor and a second switch element which are connected in series between the AC power input lines and which are connected in parallel to the first resistor and the first switch element, to turn off the first switch element upon receiving an electric current during supply of the AC power, and to turn on the first switch element in response to cutoff of the AC power so as to discharge the first capacitor through the first resistor and the first switch element;
a second capacitor charged with electricity through the second resistor during a supply of the AC power to turn on the second switch element; and
a third resistor usable together with the second capacitor to turn off the second switch element by discharging the second capacitor during a cutoff of the AC power, wherein at least one of the first switch element and the second switch element is directly connected to a neutral terminal of the AC power input lines.

19. An image forming apparatus including a discharge circuit connected between AC power input lines receiving an AC power to discharge a first capacitor charged with electricity by the AC power, the discharge circuit comprising:
- a first discharge circuit including:
  - a first resistor and a first switch element connected in series between the AC power input lines, and
  - a second resistor and a second switch element which are connected in series between the AC power input lines, turn off the first switch element upon receiving an electric current during supply of the AC power, and turn on the first switch element in response to cutoff of the AC power so as to discharge the first capacitor in a direction of first polarity through the first resistor and the first switch element, and
- a second discharge circuit including:
  - a third resistor and a third switch element connected in series between the AC power input lines, and
  - a fourth resistor and a fourth switch element which are connected in series between the AC power input lines, turn off the third switch element upon receiving an electric current during supply of the AC power, and turn on the third switch element in response to cutoff of the AC power so as to discharge the first capacitor in a direction of second polarity opposite to the first polarity through the third resistor and the third switch element, wherein a resistance value of the second resistor is higher than a resistance value of the first resistor, and a resistance value of the fourth resistor is higher than a resistance value of the third resistor.

20. A power supply unit including a discharge circuit connected between AC power input lines receiving an AC power to discharge a first capacitor charged with electricity by the AC power, comprising:
- a first resistor and a first switch element connected in series between the AC power input lines; and
- a controller to turn off the first switch element in response to a DC voltage drop detection signal, wherein the controller includes a second resistor and a second switch element which are connected in series between the AC power input lines and which are connected in parallel to the first resistor and the second switch element;
- a second capacitor charged with electricity through the second resistor during a supply of the AC power to turn on the second switch element; and
- a third resistor usable together with the second capacitor to turn off the second switch element by discharging the second capacitor during a cutoff of the AC power, wherein at least one of the first switch element and the second switch element is directly connected to a neutral terminal of the AC power input lines.

21. The power supply unit of claim 20, further comprising:
- a battery to supply power to the controller when the AC power is cut off.

22. The power supply unit of claim 20, wherein the first resistor includes a plurality of resistor elements connected in series.

23. The discharge circuit of claim 1, wherein both the first switch element and the second switch element are directly connected to the neutral terminal of the AC power input lines.

24. The discharge circuit of claim 1, wherein the at least one of the first switch element and the second switch element are directly connected to the neutral terminal of the AC power input lines without having any one of a resistor, a capacitor, a diode, an inductor, and a transistor connected between the at least one of the first switch element and the second switch element and the neutral terminal of the AC power input lines.

* * * * *